US008854491B2

(12) United States Patent
Ford et al.

(10) Patent No.: US 8,854,491 B2
(45) Date of Patent: Oct. 7, 2014

(54) METADATA-ASSISTED IMAGE FILTERS

(75) Inventors: Bradley D. Ford, San Jose, CA (US);
Garrett M. Johnson, San Francisco, CA (US); Cédric Bray, Vincennes (FR); Avi Cieplinski, San Francisco, CA (US); May-Li Khoe, San Francisco, CA (US); B. Michael Victor, Castro Valley, CA (US); Bianca Cheng Costanzo, San Francisco, CA (US); Jeffrey Trær Bernstein, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 382 days.

(21) Appl. No.: 13/181,628

(22) Filed: Jul. 13, 2011

(65) Prior Publication Data

US 2012/0307096 A1    Dec. 6, 2012

Related U.S. Application Data

(60) Provisional application No. 61/493,482, filed on Jun. 5, 2011.

(51) Int. Cl.
H04N 5/228    (2006.01)
G06T 5/10    (2006.01)
H04N 5/262    (2006.01)
H04N 5/232    (2006.01)

(52) U.S. Cl.
CPC ......... H04N 5/23219 (2013.01); H04N 5/2621 (2013.01); H04N 5/23229 (2013.01)
USPC .................. 348/222.1; 348/211.3; 348/231.3; 348/231.5; 348/231.6; 382/224

(58) Field of Classification Search
USPC ....................... 348/222.1, 239; 386/278–290; 382/276–308
See application file for complete search history.

(56) References Cited

U.S. PATENT DOCUMENTS

| 6,323,846 | B1 | 11/2001 | Westerman et al. |
| 6,570,557 | B1 | 5/2003 | Westerman et al. |
| 6,677,932 | B1 | 1/2004 | Westerman |
| 6,888,536 | B2 | 5/2005 | Westerman et al. |
| 7,479,949 | B2 | 1/2009 | Jobs et al. |
| 7,614,008 | B2 | 11/2009 | Ording |
| 7,656,394 | B2 | 2/2010 | Westerman et al. |

(Continued)

OTHER PUBLICATIONS

U.S. Appl. No. 12/755,542, filed Apr. 7, 2010, Brunner.

Primary Examiner — Twyler Haskins
Assistant Examiner — Dwight C Tejano
(74) Attorney, Agent, or Firm — Schwegman Lundberg & Woessner, P.A.

(57) ABSTRACT

This disclosure pertains to devices, methods, systems, and computer readable media for generating and/or interpreting image metadata to determine input parameters for various image processing routines, e.g., filters that distort or enhance an image, in a way that provides an intuitive experience for both the user and the software developer. Such techniques may attach the metadata to image frames and then send the image frames down an image processing pipeline to one or more image processing routines. Image metadata may include face location information, and the image processing routine may include an image filter that processes the image metadata in order to keep the central focus (or foci) of the image filter substantially coincident with one or more of the faces represented in the face location information. The generated and/or interpreted metadata may also be saved to a metadata track for later application to unfiltered image data.

26 Claims, 16 Drawing Sheets

(56) References Cited

U.S. PATENT DOCUMENTS

| | | |
|---|---|---|
| 7,663,607 B2 | 2/2010 | Hotelling et al. |
| 7,812,826 B2 | 10/2010 | Ording et al. |
| 7,814,061 B2 | 10/2010 | Kuberka et al. |
| 7,840,912 B2 | 11/2010 | Elias et al. |
| 7,844,914 B2 | 11/2010 | Andre et al. |
| 7,864,163 B2 | 1/2011 | Ording et al. |
| 2004/0114796 A1* | 6/2004 | Kaku ............................ 382/165 |
| 2005/0104976 A1 | 5/2005 | Currans |
| 2005/0117798 A1 | 6/2005 | Patton et al. |
| 2006/0026521 A1 | 2/2006 | Hotelling |
| 2006/0026535 A1 | 2/2006 | Hotelling et al. |
| 2006/0026536 A1 | 2/2006 | Hotelling et al. |
| 2006/0033724 A1 | 2/2006 | Chaudhri et al. |
| 2006/0197753 A1 | 9/2006 | Hotelling |
| 2007/0052820 A1* | 3/2007 | Ikeda ........................ 348/231.99 |
| 2007/0065134 A1* | 3/2007 | Sugimoto ..................... 396/165 |
| 2007/0081740 A1* | 4/2007 | Ciudad et al. ................. 382/276 |
| 2007/0257890 A1 | 11/2007 | Hotelling et al. |
| 2008/0309788 A1* | 12/2008 | Onozawa ................... 348/222.1 |
| 2009/0022357 A1 | 1/2009 | Katz |
| 2009/0202169 A1 | 8/2009 | Hayashi |
| 2010/0141784 A1* | 6/2010 | Yoo ............................ 348/222.1 |

\* cited by examiner

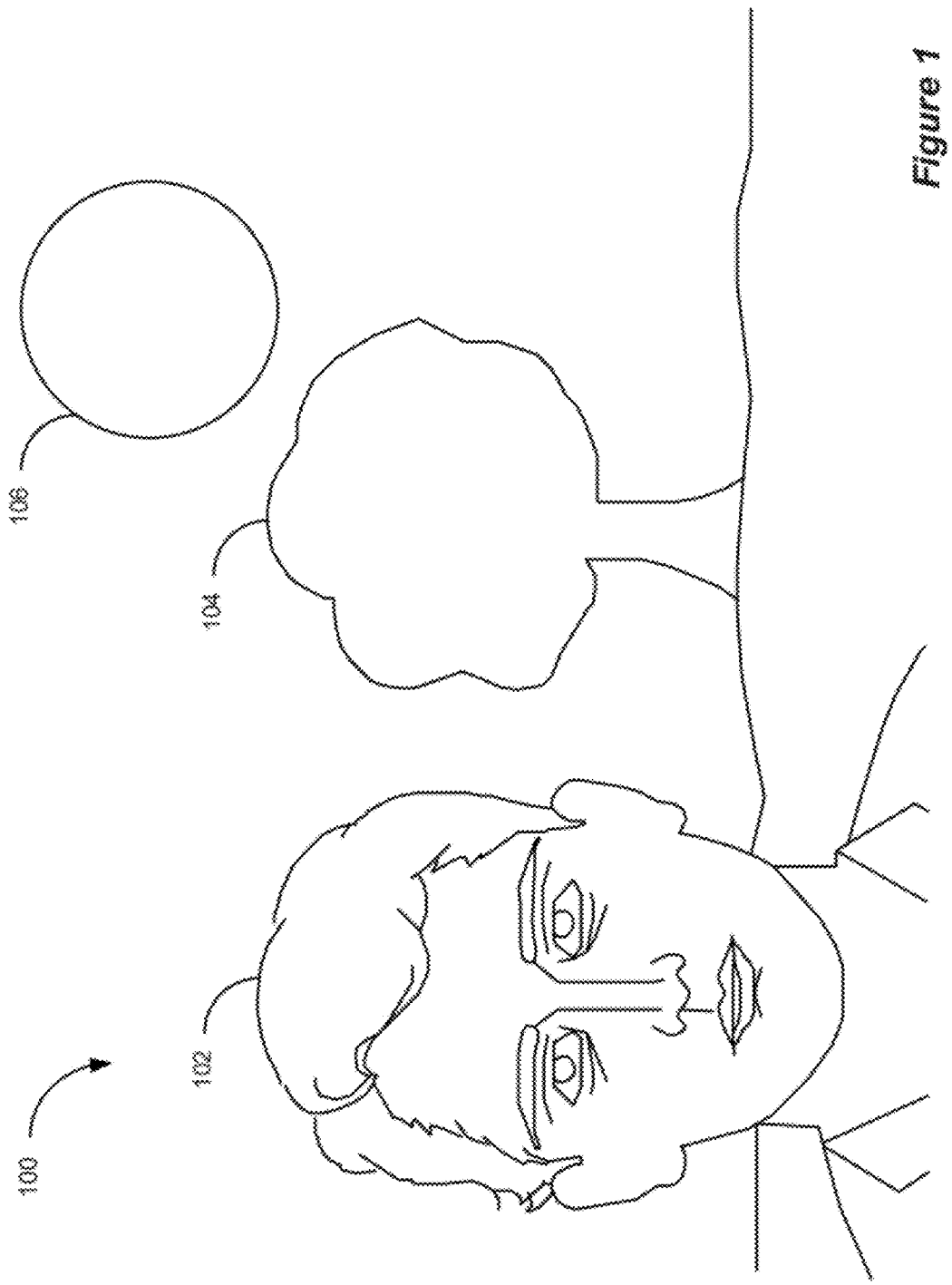

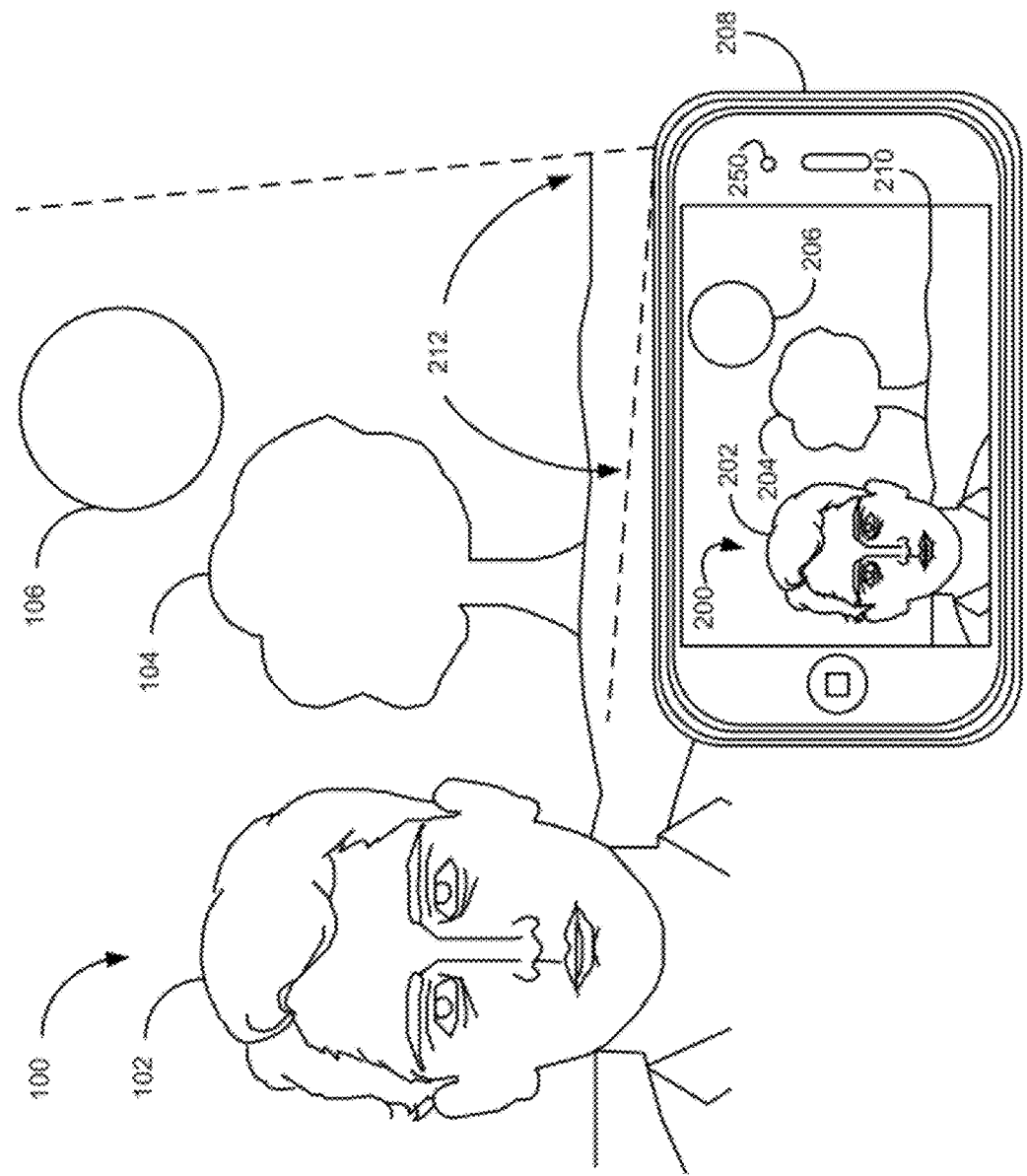

METADATA-ASSISTED IMAGE FILTERS

CROSS-REFERENCE TO RELATED APPLICATIONS

This application claims priority to U.S. Provisional Patent Application Ser. No. 61/493,482, filed on Jun. 5, 2011, entitled, "Metadata-Assisted Image Filters." This application is also related to commonly-assigned U.S. patent application Ser. No. 13/052,895, filed on Mar. 21, 2011, entitled, "Gesture-Based Configuration of Image Processing Techniques" and commonly-assigned U.S. patent application Ser. No. 13/052,994, filed on Mar. 21, 2011, entitled, "Gesture Mapping for Image Filter Input Parameters," each of which is hereby incorporated by reference in its entirety.

BACKGROUND

The disclosed embodiments relate generally to electronic devices having image sensors, and more particularly to electronic devices having image sensors that display filtered images on a display.

As electronic devices have become more and more advanced, the number of functions able to be performed by a given device has steadily increased, especially in the area of multimedia capture and processing. As such, it has become a significant challenge to design a multimedia processing framework that allows users and client applications to easily interact with and process such multimedia information.

Some portable electronic devices have employed touch-sensitive displays (also known as a "touch screens") with a graphical user interface (GUI), one or more processors, memory and one or more modules, programs, or sets of instructions stored in the memory for performing multiple functions. In some embodiments, the user interacts with the GUI primarily through finger contacts and gestures on the touch-sensitive display. In some embodiments, the functions may include telephony, video conferencing, e-mailing, instant messaging, blogging, digital photographing, digital video recording, web browsing, digital music playing, and/or digital video playing. Instructions for performing these functions may be included in a computer readable storage medium or other computer program product configured for execution by one or more processors.

Touch-sensitive displays can provide portable electronic devices with the ability to present intuitive user interfaces for viewing and navigating GUIs and multimedia content. Such interfaces can increase the effectiveness, efficiency and user satisfaction with activities like digital photography on portable electronic devices. In particular, portable electronic devices used for digital photography and digital video may provide the user with the ability to perform various image processing techniques, such as filtering, focusing, exposing, optimizing, or otherwise adjusting captured images—either in real-time as the image frames are being captured by the portable electronic device's image sensor or after the image has been stored in the device's memory, As image processing capabilities of portable electronic devices continue to expand and become more complex, software developers of client applications for such portable electronic devices increasingly need to understand how the various inputs and information related to images captured by the device should be translated into input parameters for the image processing routines. As a simple example, consider a single tap gesture at a particular coordinate (x, y) on a touch screen. One example of translating the input point location of (x, y) to an "auto exposure" image processing routine input parameter would be to cause the coordinate (x, y) to serve as the center of a rectangular box over which the image sensor will attempt to base the setting of the camera's exposure parameters for the next captured image frame. With more complex image processing routines, however, such as graphically intensive image distortion filters, the number and type of input parameters may become too complex for the user to specify in real-time or for client software applications to be able to interpret and/or process correctly.

Accordingly, there is a need for techniques to implement a programmatic interface to generate and/or interpret image metadata (e.g., through the use of advanced image processing techniques such as face detection) in order to determine input parameters for various image processing routines in a more pleasing and intuitive way.

SUMMARY

With more complex image processing routines being carried out on personal electronic devices, such as graphically intensive image filters, e.g., filters that distort or enhance an image, the number and type of inputs, as well as logical considerations regarding the setting of input parameters for the image processing routines may become too complex for the user to specify in real-time or for client software applications to readily interpret and/or process correctly. Alternately, the user may have a more enjoyable experience if the input parameters for the image processing routines are set for them automatically based on one or more characteristics of the image data.

As such, metadata information may be generated and/or processed based on the image data captured by an image sensor of a personal electronic device. The generated and/or interpreted metadata for image frames may then be attached to the corresponding image frame and sent down an image processing pipeline and on to one or more image processing routines, which may be executed by a client application.

In one embodiment described herein, one or more processors in a personal electronic device may receive the selection of image filter(s) to be applied. The device may receive image data from one or more sensors which may be disposed within or upon the device (e.g., an image sensor). The device may generate metadata corresponding to the received image data at the time of capture or after the time of capture, and then use the generated metadata to determine appropriate input parameters for the selected image filter(s). Finally, the selected image filtering routines may be applied, and a filtered image may be returned to the device's display and/or stored to a memory in communication with the device. In some embodiments, the image filter may be applied in near-real time, i.e., substantially immediately after the act of passing the appropriate input parameters to the selected image filter occurs.

In another embodiment, the image metadata may comprise face location information, and the image processing routine may comprise an image distortion and/or enhancement filter that processes the image metadata in order to keep a central focus or foci of the image filter substantially coincident with one or more of the faces represented by the face location information. By attaching timestamped metadata information to successive image frames as they are placed into a memory buffer and distributed to client applications, image filtering may be performed on the corresponding image frame data based on the attached metadata and the selected image filter. One of ordinary skill will recognize that other metadata, e.g., gyro metadata, may also be associated with some, but not necessarily all, frames. In some embodiments, the image data may be placed into a shared memory buffer with a client application, such that the image data information does not have to be copied and sent to the client application.

In still other embodiments, the generated and/or interpreted metadata may be saved to a "metadata track," i.e., a time-tagged sequence of attached metadata for each captured image frame, for later application to unfiltered image data. Once a device has started to capture image data, e.g., in the form of a video stream of images, the metadata may be generated and/or interpreted, and then, rather than being used to determine the appropriate input parameters for the real-time application of the selected image filter(s), the process may instead store only the metadata track information to memory. The metadata track may then be applied to an unfiltered version of the image data and rendered at a later time, perhaps by a device having a more powerful processor.

Thus, in one embodiment, an image processing method is disclosed that involves obtaining a first image having a plurality of faces, and then identifying and characterizing at least one of the faces. Metadata relating to the identified and characterized face may then be associated with the image, and an image filter (e.g., a distortion and/or enhancement filter) applied to the first image to generate a second image, wherein the "central focus" (or foci) of the filter is centered at one or more of the faces. The second image may then be stored in a second memory. It will be understood that as used here, the phrase "second image" may be retained in a wholly separate memory or it may be the first image updated/modified in accordance with the specified filter(s). It should also be noted that the "second memory" may be located in the same physical location as the "first memory."

In yet another embodiment, an image processing method is disclosed that involves: (a) receiving data representative of an image; (b) receiving metadata relating to the image; (c) identifying a face in the image based on the metadata; (d) determining one or more input parameters to an image filter based on the metadata; (e) applying the image filter centered at the identified face using the one or more input parameters to generate a filtered image; and (f) storing the filtered image in a memory. In such embodiments, the image filter has a central focus (or foci) having a location determined at least in part by the corresponding input parameters for each image.

In still another embodiment, an image processing system is disclosed that has a server process for receiving and processing images. The server process may also generate metadata related to an image, such as: information representative of the image, format description information for the image, and a dictionary of attachments. The server process may then associate the metadata and the image with a buffer frame and send the buffer frame to a client application. In some applications, buffer frames may be placed into a common memory area, accessible to both the server process and a client application. The client application can then process each buffer frame as it is received, using the metadata as a guide for how to filter the image data associated with the corresponding buffer frame.

Metadata-assisted image processing techniques in accordance with the various embodiments described herein may be implemented directly by a device's hardware and/or software, thus making these metadata-assisted image filtering techniques readily applicable to any number of electronic devices, such as mobile phones, personal data assistants (PDAs), portable music players, monitors, televsions, as well as laptop, desktop, and tablet computer systems.

BRIEF DESCRIPTION OF THE DRAWINGS

FIG. 1 illustrates a typical image scene with a human subject, in accordance with one embodiment.

FIG. 2 illustrates a typical image scene with a human subject as viewed on a camera device's preview screen, in accordance with one embodiment.

DETAILED DESCRIPTION

Figure 3A:
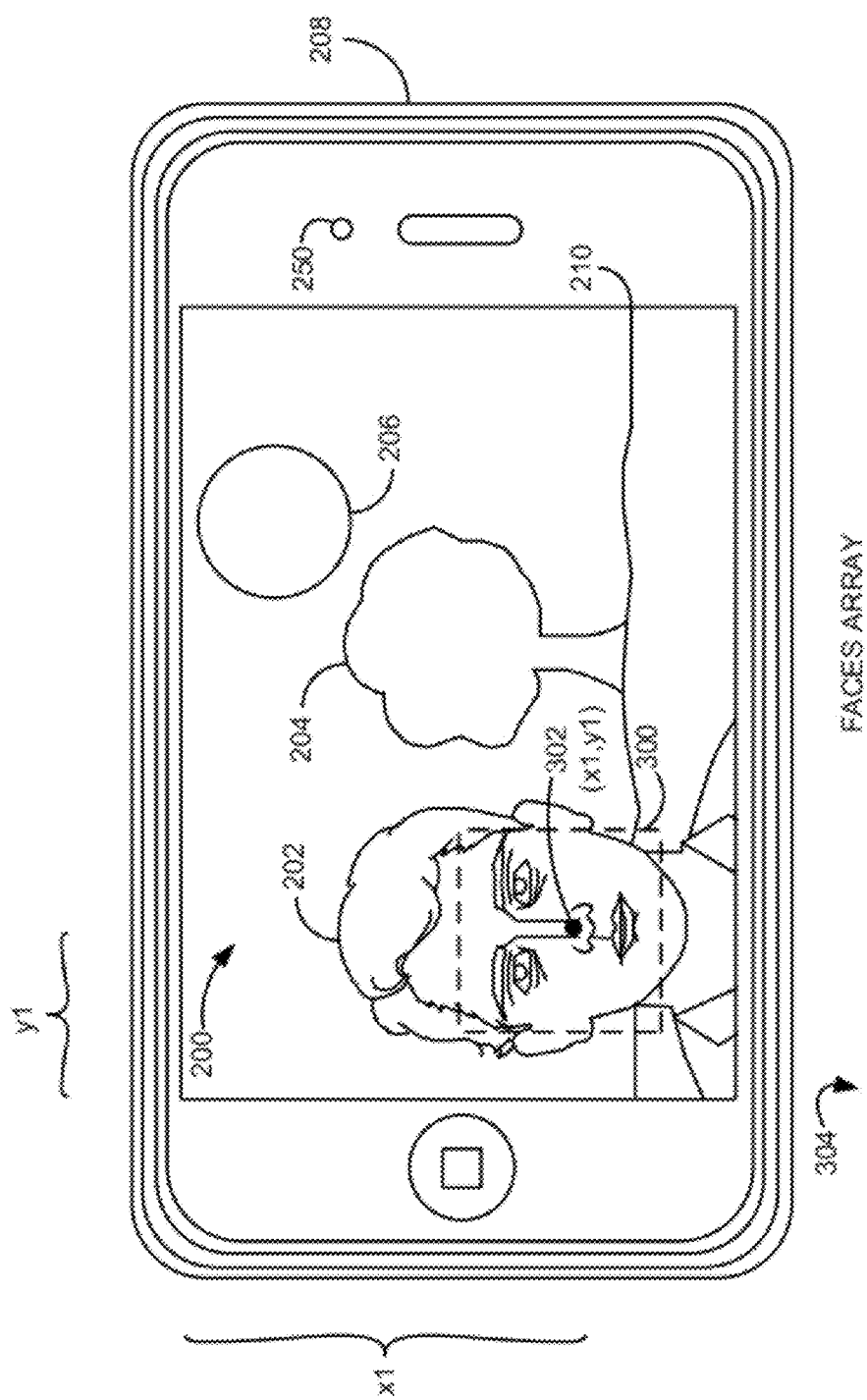
FIG. 3A illustrates a face located at a first location in an image scene and a corresponding face information array, in accordance with one embodiment.

This disclosure pertains to devices, methods, systems, and computer readable media for generating and/or interpreting image metadata to determine input parameters for various image processing routines, e.g., image filters, in a way that can provide a seamless, dynamic, and intuitive experience for both the user and the software developer. Such techniques may attach the generated and/or interpreted metadata to image frames and then send the image frames down an image processing pipeline to one or more image processing routines. In one embodiment, the image metadata comprises face location information, and the image processing routine comprises an image distortion and/or enhancement filter that processes the image metadata in order to keep the central focus (or foci) of the image filter substantially coincident with one or more faces represented in face location information. In other embodiments, the generated and/or interpreted metadata may be saved to an extended metadata platform (XMP) or sidecar file.

The techniques disclosed herein are applicable to any number of electronic devices with optical sensors. For example, digital cameras, digital video cameras, mobile phones, personal data assistants (PDAs), portable music players, monitors, televisions, and, of course, desktop, laptop, and tablet computer displays.

In the interest of clarity, not all features of an actual implementation are described in this specification. It will of course be appreciated that in the development of any such actual implementation (as in any development project), numerous decisions must be made to achieve the developers' specific goals (e.g., compliance with system- and business-related constraints), and that these goals will vary from one implementation to another. It will also be appreciated that such development effort might be complex and time-consuming, but would nevertheless be a routine undertaking for those of ordinary skill having the benefit of this disclosure.

In the following description, for purposes of explanation, numerous specific details are set forth in order to provide a thorough understanding of the inventive concept. As part of the description, some structures and devices may be shown in block diagram form in order to avoid obscuring the invention. Moreover, the language used in this disclosure has been principally selected for readability and instructional purposes, and may not have been selected to delineate or circumscribe the inventive subject matter, resort to the claims being necessary to determine such inventive subject matter. Reference in the specification to "one embodiment" or to "an embodiment" means that a particular feature, structure, or characteristic described in connection with the embodiments is included in at least one embodiment of the invention, and multiple references to "one embodiment" or "an embodiment" should not be understood as necessarily all referring to the same embodiment.

Referring now to FIG. 1, typical image scene 100 with human subject 102 is shown, in accordance with one embodiment. Scene 100 also includes Sun 106 and a natural object, tree 104. Scene 100 will be used in subsequent figures as an exemplary scene to illustrate various image processing techniques described herein.

Referring now to FIG. 2, typical image scene 200 with human subject 202 as viewed on camera device 208's preview screen 210 is shown, in accordance with one embodiment. Dashed lines 212 indicate the viewing angle of the camera (not shown) on the reverse side of camera device 208. Camera device 208 may also possess a second camera, such as front-facing camera 250. As mentioned previously, although camera device 208 is shown here as a mobile phone, the teachings presented herein are equally applicable to any electronic device capable of image capture, such as, but not limited to: digital video cameras, personal data assistants (PDAs), portable music players, laptop/desktop/tablet computers, or conventional digital cameras. Each object in scene 100 has a corresponding representation in scene 200 as viewed on camera device 208's preview screen 210. For example, human subject 102 is represented as object 202, tree 104 is represented as object 204, and Sun 106 is represented as object 206.

Referring now to FIG. 3A, face 300 located at first location 302 in image scene 200 and corresponding face information array 304 is shown, in accordance with one embodiment. In FIG. 3A, face 300 is circumscribed by a dashed line bounding rectangle. The location and dimensions of bounding rectangle may be returned by any number of facial detection algorithms, e.g., the Viola Jones framework or the Open Source Computer Vision Library (OpenCV). In certain embodiments, the bounding rectangle may be inset over a located face, and in other embodiments the bounding rectangle may be drawn to circumscribe an area larger than, though still coincident with, the located face. In still other embodiments, the location of a face may be defined by a circle having a central point and a radius. In FIG. 3A, location of face 300 is shown as being centered over point 302 having coordinate (x1, y1). In this example, the x-coordinate refers to the shorter of the image's two dimensions, and the y-coordinate refers to the longer of the image's two dimensions. In addition to the x- and y-coordinate, an image's width and height may be provided.

Also shown in FIG. 3A is corresponding face information array 304. Array 304 may contain metadata describing one or more of the faces located in scene 200. In some embodiments of a process described herein, array 304 may be attached as a "dictionary" to a sample buffer frame reference containing the image data representative of scene 200, as will be described in further detail below. Array 304 may contain information such as the number of faces in the scene, a unique identifier for each located face, the location and dimensions of a bounding rectangle or bounding circle for each located face, a confidence score for each located face (i.e., a metric indicative of the facial detection algorithm's confidence in there being a face within the located bounding rectangle), other metrics describing the face (e.g., smile presence or absence, number of open eyes located, red-eye artifact presence or absence, persistence of face within the scene, etc.), and a timestamp that may tie particular array 304 to a particular sample buffer frame reference and/or a particular time at which underlying image frame corresponding to the array was created. In some embodiments, the timestamp may comprise a sample buffer frame reference identifier that uniquely ties the array metadata to a particular captured image frame. In one embodiment, video frame buffers may be timestamped using the host computer's time/clock at which the video frame's first line began to be scanned in. The timestamp may become important when client applications are attempting to interpret the metadata in order to apply an image filter to a particular frame of image data (e.g., a distortion or enhancement filter).

Figure 3B:
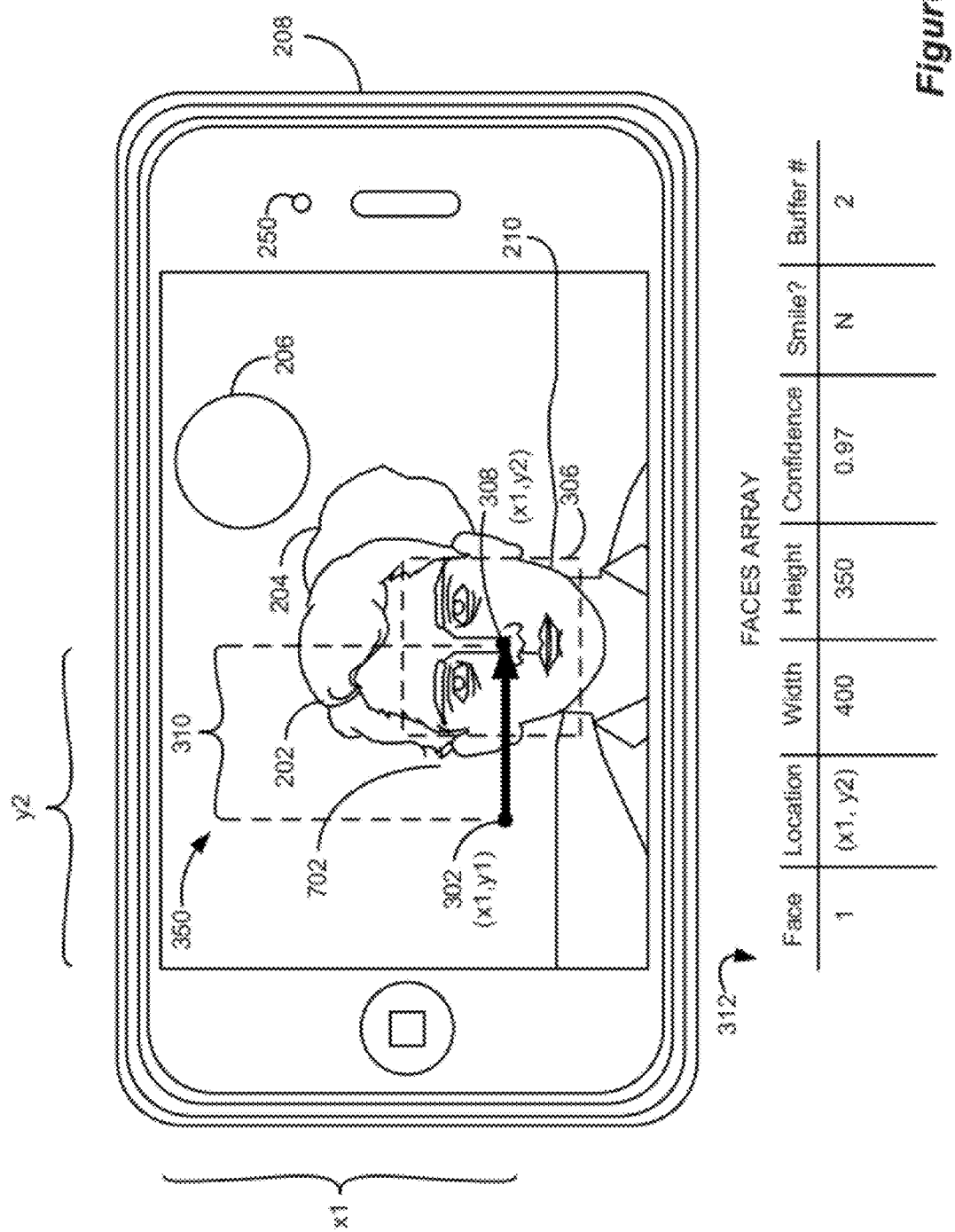
FIG. 3B illustrates a face located at a second location in an image scene and a corresponding face information array, in accordance with one embodiment.

Referring now to FIG. 3B, face 306 located at second location 308 in image scene 350 and a corresponding face information array 312 is shown, in accordance with one embodiment. In FIG. 3B, face 306 is circumscribed by a dashed line bounding rectangle. The location of face 306 is shown as being centered over point 308 having coordinate (x1, y2). Thus, between FIGS. 3A and 3B, subject 202 has apparently moved to the right along path 310, as indicated by the thick black arrow pointing to the right with respect to the image. Thus, the data in the faces array has been updated between FIG. 3A (in which it comprised metadata for scene 200) and FIG. 3B (in which it comprises metadata for scene 350). Specifically, the location of the face of subject 202 has moved from location (x1, y1) to location (x1, y2). Additionally, the timestamp for the array 304 in FIG. 3A tied the sample buffer frame reference to Buffer #1, whereas the timestamp for array 312 in FIG. 3B ties the sample buffer frame reference to Buffer #2. Thus, it may be determined that subject 202 moved along path 310 between the capture of Buffer #1 and Buffer #2. In the example of FIGS. 3A and 3B, other characteristics of the located face (such as the dimensions, confidence, and smile indicator) have remained the same in the metadata between Buffer #1 and Buffer #2, but this will not always be the case; as the located face could become closer to, or farther from, the camera, point in a different direction, or disappear altogether between successive image frames. According to one embodiment, the central focus of an image filter may have automatically remained substantially coincident with the face of subject 202 as face of subject 202 moved along path 310.

Figure 4:
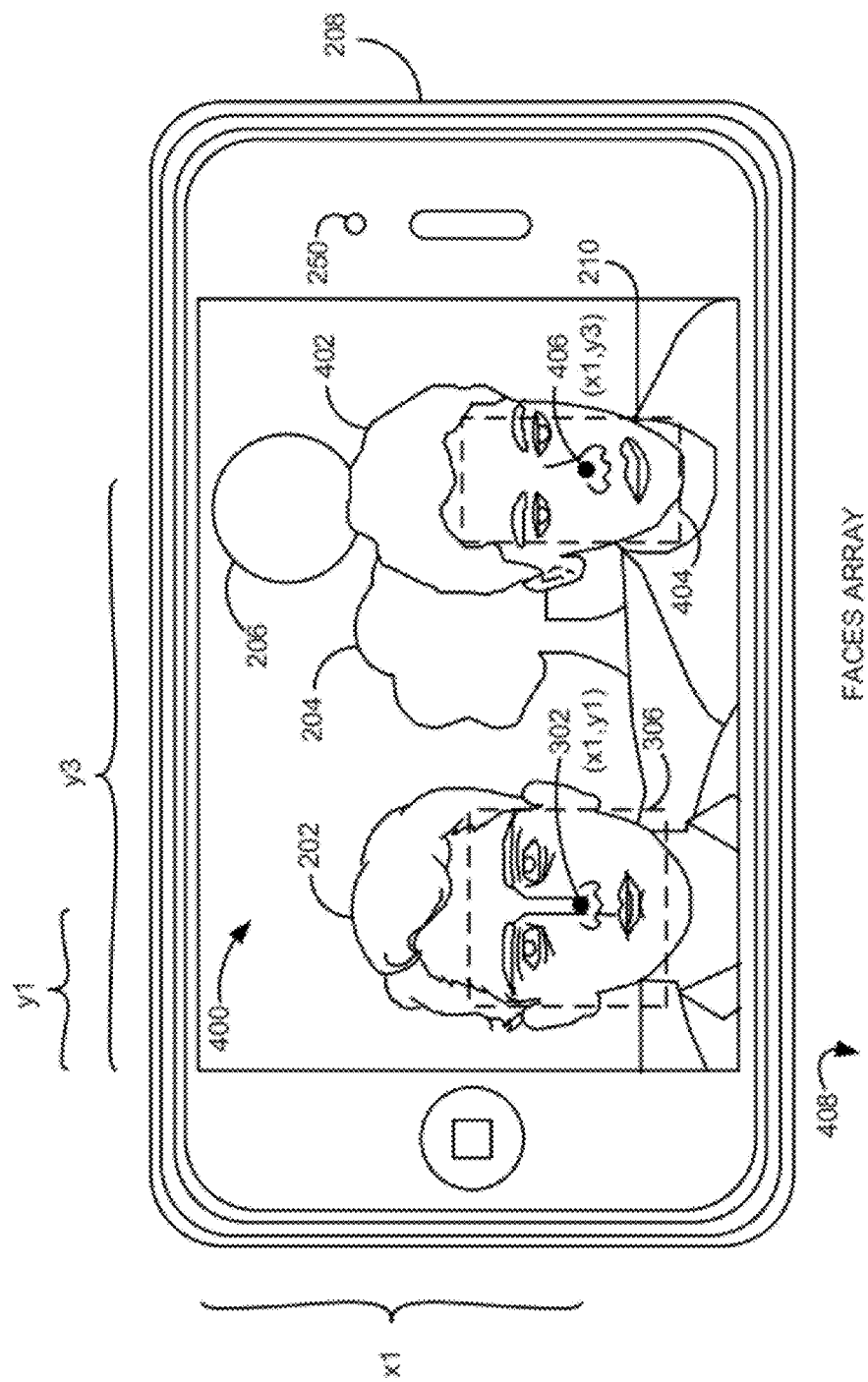
FIG. 4 illustrates a pair of faces located at first and second locations in an image scene and a corresponding face information array, in accordance with one embodiment.

Referring now to FIG. 4, a pair of faces 306/404 located at first and second locations in image scene 400 and a corresponding face information array 408 are shown, in accordance with one embodiment. In FIG. 4, face 306 corresponding to subject 202 is circumscribed by a dashed line bounding rectangle centered over point 302 having coordinate (x1, y1), and face 404 corresponding to subject 402 is circumscribed by a dashed line bounding rectangle centered over point 406 having coordinate (x1, y3). Array 408 has been populated to comprise metadata for scene 400. Specifically, the locations of the face of subject 202 (x1, y2) and the face of subject 402 (x1, y3) are each represented as separate entries in array 408. Additionally, the timestamp for the array 408 in FIG. 4 ties the sample buffer frame reference to Buffer #4, whereas the timestamp for array 304 in FIG. 3A tied the sample buffer frame reference to Buffer #1 and the timestamp for array 312 in FIG. 3B tied the sample buffer frame reference to Buffer #2. Thus, it may be determined that subject 402 moved to a new location (i.e., into scene 400, where he is now standing adjacent to subject 202) between the capturing of Buffer #2 and Buffer #4.

In the example of FIG. 4, other characteristics of the located faces have also been populated into array 408. Specifically, the identifiers, locations, dimensions, confidence metrics and buffer frame references have been populated into array 408. Additionally, Face 2 in array 408, which corresponds to face 404 in scene 400 is listed as having a '?' in the "Smile?" column. This is to indicate that, in some instances, the face array metadata may be incomplete or even incorrect if the facial detection algorithm does not find sufficient information from the scene to completely characterize or classify a given face.

According to one embodiment, an image distortion and/or enhancement filter with two foci may have one focus automatically remain substantially coincident with the face of subject 202 and the other focus automatically remain substantially coincident with the face of subject 402 as the faces of the subjects move around within scene 400. In one particular example of a multi-focus image distortion filter, the image data coincident with the location of the face of subject 202 could be swapped out with the image data coincident with the location of the face of subject 404 and updated in real-time as the subjects moved around scene 400.

Figure 5:
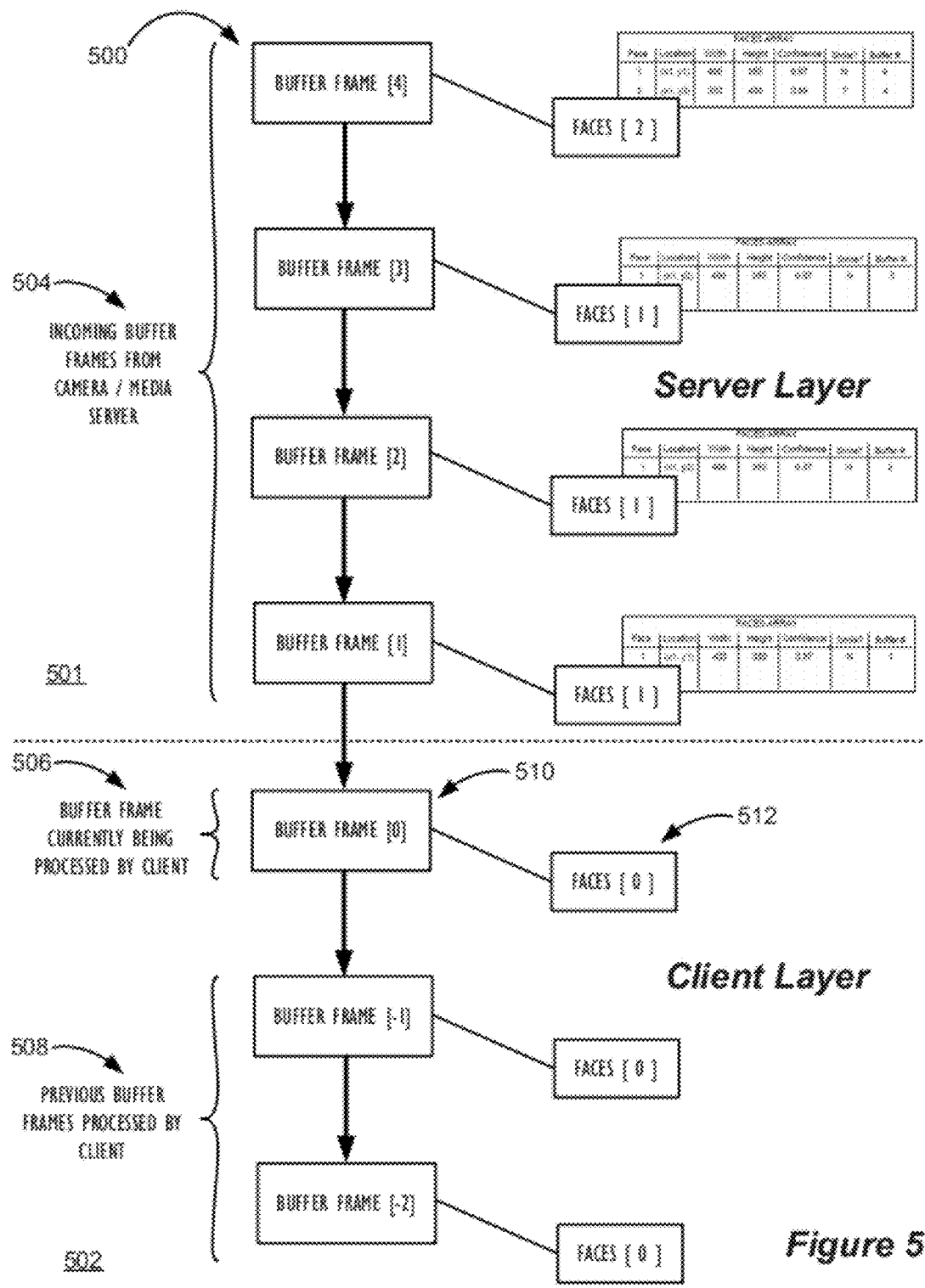
FIG. 5 illustrates an image frame buffer pipeline and exemplary buffer frame references, in accordance with one embodiment.

Referring now to FIG. 5, image frame buffer pipeline 500 and exemplary buffer frame references 510 are shown, in accordance with one embodiment. As shown, image frame buffer pipeline 500 comprises both Server Layer 501 and Client Layer 502. Server Layer 501 may comprise a background process, e.g., a daemon process, running on the personal electronic device performing the image capturing. This background process may be in communication with the device's image sensor, and be programmed to perform various operations on the image data, such as resizing the image data returned from the sensor, synchronizing the image data with the generated and/or processed image metadata, or performing noise reduction, such as temporal noise reduction, on the image data. The image data processed by the Server Layer 501 may reside in shared memory, such that both Server Layer 501 and Client Layer 502 may access the shared memory seamlessly, without the need for large amounts of image data to be copied and transmitted to Client Layer 502.

As shown in FIG. 5, a plurality of buffer frame references 510 are traveling down an image processing pipeline from Server Layer 501 to Client Layer 502, where the image data may ultimately be displayed to a user or otherwise manipulated by a user. Incoming buffer frames 504 from Server Layer 501 are enumerated with descending positive integers, with larger integers indicating buffer frames that correspond to later timestamps. That is, Buffer Frame [1] is one frame away from being sent to Client Layer 502, Buffer Frame [2] is two frames away from being sent to Client Layer 502, and so forth.

In one implementation, face detection data for frame n might be attached to a later frame, such as frame n+1. Face detection operations can be slower than real-time and the lag is not acceptable for low latency capture. In such cases, the original frame may be sent along the capture pipeline while still being inspected for faces. Once faces are discovered, the metadata for frame n may be attached to the currently "ready-to-go" frame. In general, the face data dictionary includes a timestamp which coincides with the timestamp of the original frame in which the faces were found. That original frame, however, may have already moved along the pipeline and may have already been consumed by the client. At that point it is too late to attach the metadata to that frame. As a consequence, the face data attached to frame n can contain information about faces detected in frame n−1 or n−2. The timestamp is the "glue" that holds this process together. For instance, if the data is being written to a movie file, it doesn't generally matter that the face data arrived late as it's all going to a file as metadata. When played back later, the face data will line up with the correct frames because the timestamps match.

The first buffer frame 506 in Client Layer 502 represents the buffer frame currently being processed by the client application, and is enumerated Buffer Frame [0]. Buffer frames that have previously been processed by client application 508 are enumerated with ascending negative integers, with larger negative integers indicating buffer frames that correspond to earlier timestamps. That is, Buffer Frame [−1] was the immediately previously processed frame by Client Layer 502, Buffer Frame [−2] was processed two frames ago by Client Layer 502, and so forth. The numbering scheme used in FIG. 5 is for illustrative purposes only, and does not reflect any required or preferred numbering scheme for a given implementation. For the first several frames of any given image capture operation, image metadata may lag behind the image data traveling down the image pipeline (see discussion above). Thus, until the processing pipeline is able to "catch up" with the incoming image data, the first several image frames may potentially by processed with slightly asynchronous image metadata.

As will be discussed in reference to FIG. 6, each sample buffer frame reference may comprise a portion of image data, a format description for the image data being carried by the sample buffer reference frame, and a dictionary of attachments. As used here, an attachment can be a collection of key-value pairs containing metadata, processing information, or rendering instructions associated with the image data to which it is attached. For instance, there might be an attachment indicating that a particular frame was preceded by a discontinuity (such as a dropped frame) in the media stream. Processing instructions—an attachment might specify that a video frame is to be "displayed immediately" by the preview pipeline, rather than scheduled for a time in the near future. Example attachment metadata may include focus scores, whether or not the exposure is stable and the current focus position. In another embodiment, the attachment may comprise a camera metadata dictionary. The camera metadata dictionary may in turn comprise an array of faces 512, labeled as "Faces[ ]" in FIG. 5, containing information relating to the faces located in the corresponding image data. As shown in FIG. 5, buffer frames that have been analyzed by Client Layer 502 so far, i.e., Buffer frames 508, have all had empty face arrays in theft camera metadata dictionaries. This can be seen by the "Faces [0]" label attached to the buffer frames having indices 0, −1, and −2.

Incoming buffer frames 504 with indices 1, 2, and 3, on the other hand, have face arrays in their camera metadata dictionaries with one entry. In this case, the entry corresponds to the face of subject 202. Incoming buffer frame with index 4 has a face array with two entries, in this case, corresponding to the faces of subjects 202 and 402, described above in reference to FIG. 4. In certain embodiments, a client application may be able to configure the maximum number of faces or the minimum face size that it wants to process from an incoming buffer frame for a given image processing routine. In addition to face databases, many other types of dictionaries may be attached to a buffer frame further describing the image frame. For example, there may be dictionaries relating to gesture input or other sensor input received at the device during the capture of the corresponding image frame. Additionally, there may be information related to the camera settings during capture of the corresponding image attached to the buffer frame, e.g., information related to the camera's shutter speed, focal length, exposure time, etc.

Figure 6:
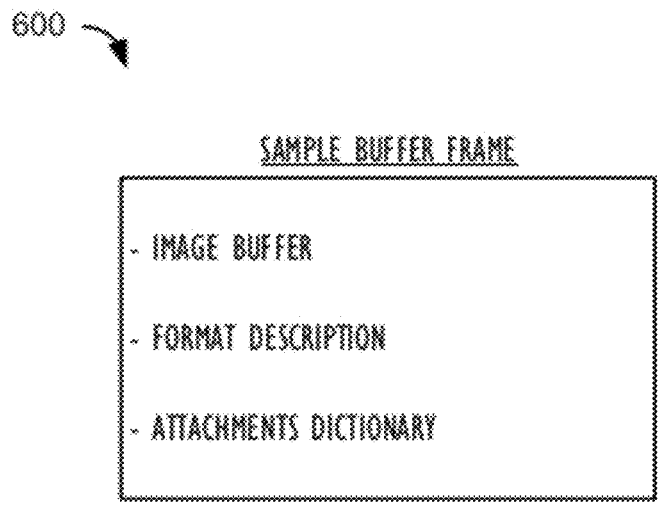
FIG. 6 illustrates an exemplary sample buffer frame reference, in accordance with another embodiment.

Referring now to FIG. 6, exemplary sample buffer frame reference 600 is shown in accordance with another embodiment. Exemplary sample buffer frame reference 600 comprises an image buffer containing image data, or at least a portion of an image's data, of the corresponding image frame, a format description for the type of image data being carried by the sample buffer frame reference, and the attachments dictionary, as described above in reference to FIG. 5. Each sample buffer may also include timing information such as a presentation timestamp, a decode timestamp and/or a duration. In some embodiments, the sample buffer frames may be reference-counted to enhance memory efficiency. That is, the sample buffer frames may persist in memory only so long as some other object is keeping a reference to the particular buffer frame. Once all references to the buffer frame have been deleted or gone out of memory scope, the sample buffer frame may be deleted via a garbage collection process or the like executing in the Server Layer runtime environment.

Figure 7:
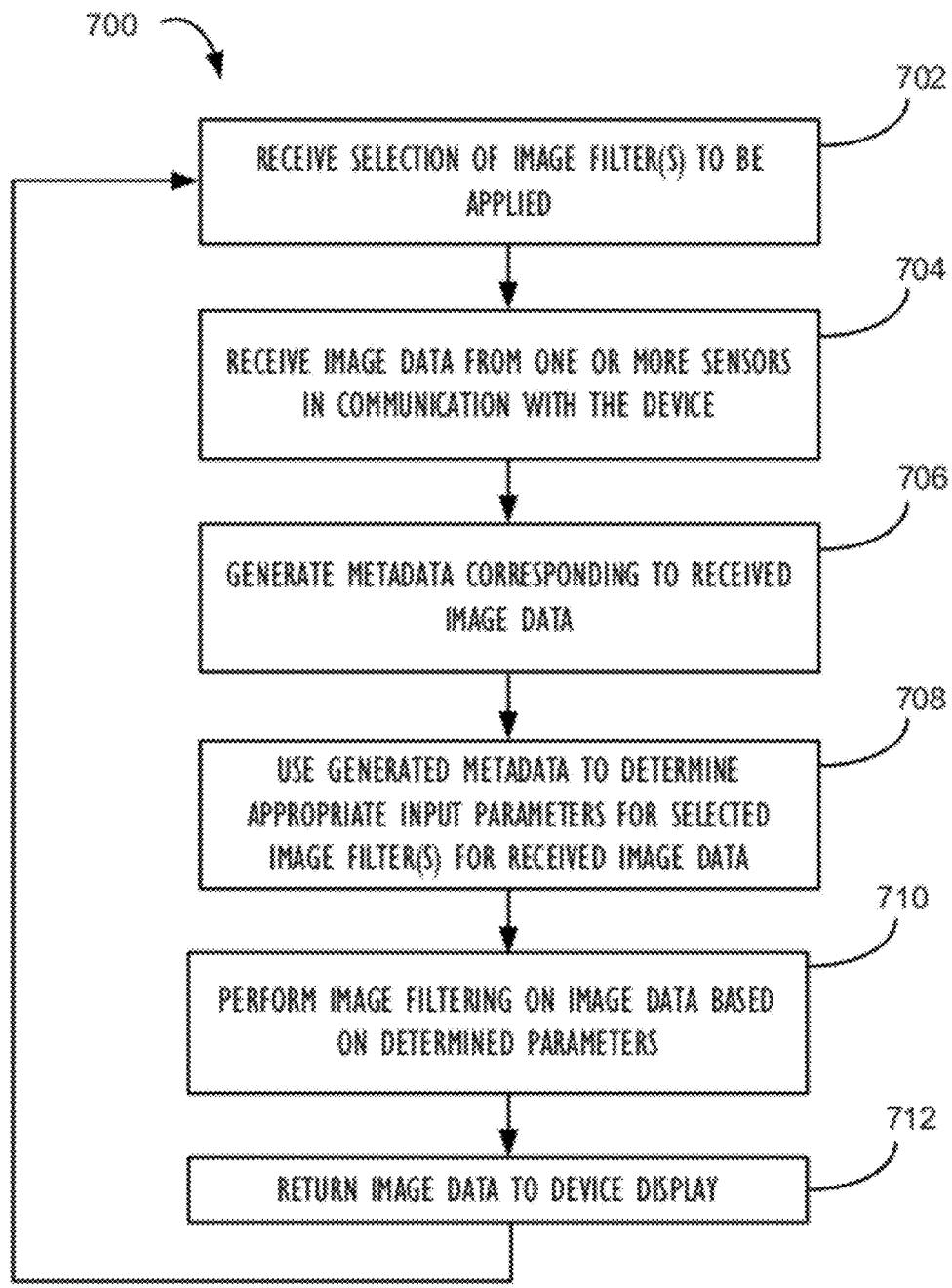
FIG. 7 illustrates, in flowchart form, one embodiment of a process for performing metadata-assisted image filtering.

Referring now to FIG. 7, process 700 for performing metadata-assisted image filtering is shown in flowchart form, in one embodiment, one or more processors in a personal electronic device may receive the selection of image filter(s) to be applied (Step 702). The selection of image filters may be input by a user of the device, e.g., through the use of touch gestures or other user interface control scheme, or may be selected programmatically by a client application. The device may also receive mage data from one or more sensors which may be disposed within or upon the device an image sensor) (Step 701). Next, or concurrent with image capture, the device may generate metadata corresponding to the received image data (Step 706) and then use the generated metadata to determine appropriate input parameters for the selected image filters) (Step 708). Finally, the selected image filtering routine(s) may be applied (Step 710), and a filtered image may be returned to the device's display (Step 712) and/or stored to a memory in communication with the device. In some embodiments, the image filter may be applied in near-real time, i.e., substantially immediately after the act of passing the appropriate input parameters to the selected image filter occurs.

In an embodiment in which the image capture device incorporates one or more special purpose graphics engines (e.g., graphical processing units, GPUs) and one or more general purpose processors (e.g., central processors, CPUs), a low-resolution version of an image may be displayed on the device's preview display at, for example, a rate of 30 frames per second. If a client decides to capture a picture based on the low-resolution image presented in the preview display, a single full-resolution image will be delivered to the client application. The full-resolution mage may have a designated filter applied by one or more of the device's CPUs. In this way, the GPU(s) may be used to perform real-time image capture operations while the CPU(s) can apply a filter to an image in real-time (thereby not interrupting the image capture operation).

While the metadata-assisted image filtering process described above includes a number of operations that appear to occur in a specific order, t should be apparent that these processes can include more or fewer steps or operations and can be executed serially or in parallel (e.g., using parallel processors or a multi-threading environment).

Figure 8:
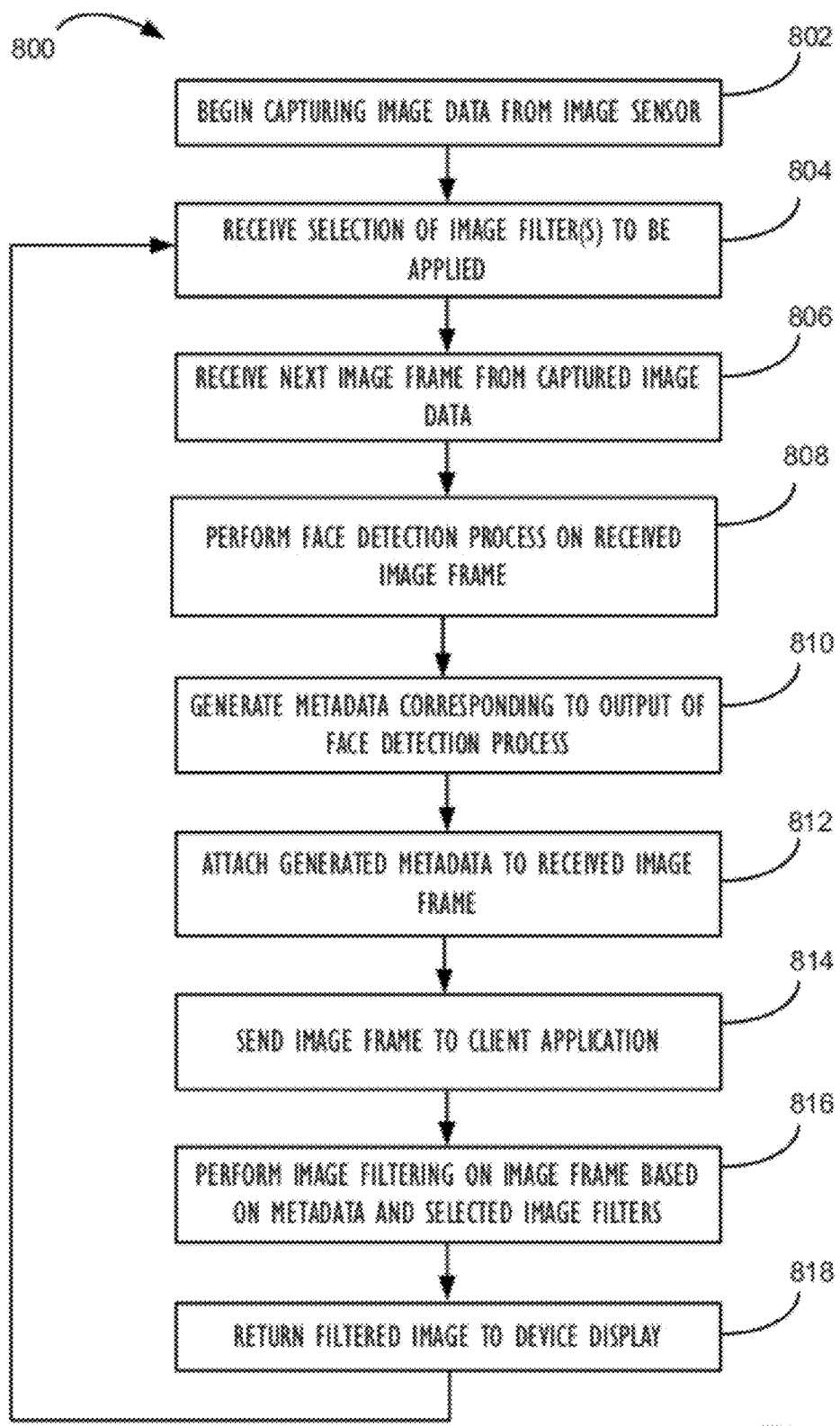
FIG. 8 illustrates, in flowchart form, one embodiment of a process for performing facial detection in conjunction with metadata-assisted image filtering.

Referring now to FIG. 8, process 800 for performing facial detection in conjunction with metadata-assisted image filtering in accordance with one embodiment is shown in flowchart form. Process 800 begins at Step 802 when the device begins to capture data from one or more image sensors disposed within or otherwise in communication with the device (Step 802). Next, the process may receive a selection of image filter(s) to be applied to the captured image data (Step 801). Process 800 may then receive the next image frame from the captured image data (Step 806). At Step 808, process 800 may perform a face detection process on the received image frame. The face detection operation may locate zero, one, or a plurality of faces at various locations in the received image. It should be noted that, if, at Step 808, it is determined (through the application of a sufficiently robust facial detection algorithm) that there are no faces with sufficient confidence scores in the image, process 800 may proceed with the image filter input parameters determined for the previous image frame, or process 800 could simply choose a default position for the effect (e.g., the middle of the frame), or the process may opt to not apply the selected image filter(s) at all for the current image frame, Next, process 800 may generate metadata corresponding to the output of the face detection process (Step 810) and attach the generated metadata to the received image frame (Step 812). For example, as mentioned above, process 800 may generate a face array or other metadata dictionary for attachment to the corresponding image frame sample buffer. Next the process may send the image frame data to a client application, e.g., in the form of a sample buffer frame (Step 814). Once at the client application, process 800 may use the attached metadata to pass the appropriate input parameters to the selected image filter(s) and perform the act of image filtering (Step 816). For example, in selected image filters, e.g., image distortion or enhancement filters that have a central "focus," one embodiment may adjust the input parameters of the selected image filters such that the "focus" of the image filter's applied effect may remain substantially coincident with one or more of the faces represented in the corresponding image metadata. Various techniques regarding the real-time tracking of detected faces in captured image sensor data are described in commonly-assigned U.S. application Ser. No. 12/755,542, entitled, "Dynamic Exposure Metering Based on Face Detection," filed on Apr. 7, 2010, which application is hereby incorporated by reference in its entirety. In some embodiments, the process may maintain the central focus of a image filter upon a currently selected face so long as the currently selected face persists in the captured image sensor data. Upon the selected face leaving the captured image sensor data, process 800 may return to Step 816 and select a new face or faces upon which to base the setting of the image filter's input parameters. As the image filter is applied to each received image frame, process 800 returns the filtered image data to the device's display (Step 818). In some embodiments, the filtered image data may be returned directly to the client application for additional processing before being displayed on the device's display. In other embodiments, a lower resolution version of the filtered image may be rendered and displayed on the device's preview screen in real- or near-real time.

Figure 9:
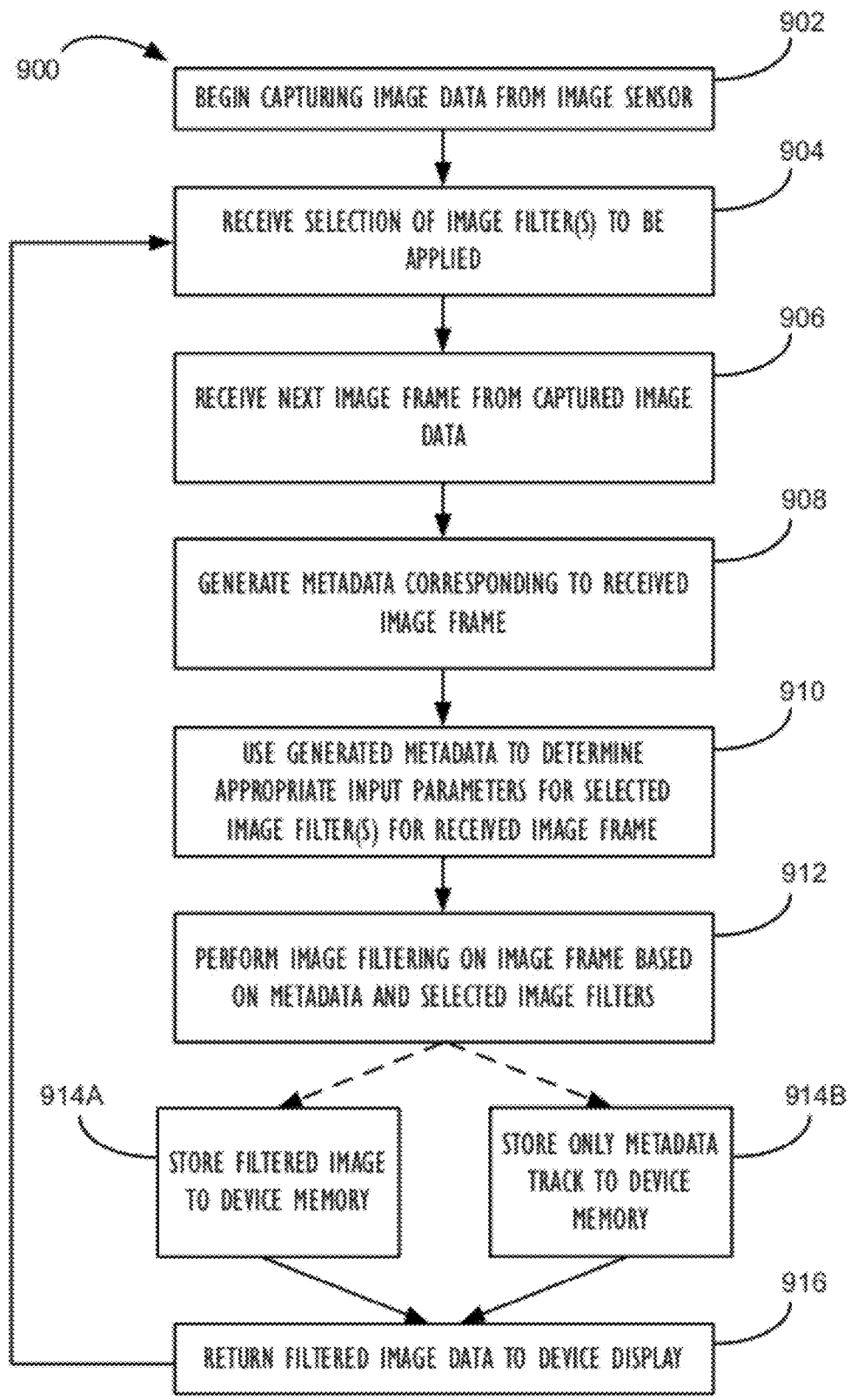
FIG. 9 illustrates, in flowchart form, one embodiment of a process for creating a metadata track in conjunction with performing metadata-assisted image filtering.

Referring now to FIG. 9, process 900 for creating a metadata track in conjunction with performing metadata-assisted image filtering in accordance with one embodiment is shown in flowchart form. First, process 900 begins by capturing image data with one or more image sensors disposed within or otherwise in communication with the device (Step 902). The image data may be part of, e.g., a video stream of images being captured by an electronic device. Next, the process proceeds to receive the selection of image filter(s) to be applied (Step 904). Process 900 may then receive the next image frame from the captured image data (Step 906). Once the next image frame is received, the device may generate metadata corresponding to the received age data (Step 908) and then use the generated metadata to determine appropriate input parameters for the selected image filter(s) (Step 910). The selected image filtering routines may then optionally be applied in real-time (Step 912), and a filtered version of the image may either be stored to a memory in communication with the device (Step 914A) or, instead, only the metadata track, i.e., the time-tagged sequence of attached metadata for each image frame captured, may be stored to the device (Step 914B). In any event, the filtered image data (if the data has indeed been filtered in real-time) may then be returned to the device display (Step 916).

In some embodiments, the metadata track approach (i.e., Step 911B) may be favored because it may be applied to an unfiltered version of the image data at a later date and time, perhaps by a device having more computational power. For instance, if a video sequence was taken by a user utilizing a personal electronic device performing the process illustrated in FIG. 9 during a car road trip, the GPS or other location information for each image frame captured with the video could be stored in the form of image metadata to the metadata track. Then, perhaps at a later time, an entire video of the car road trip could be composed, e.g., with a graphical map overlay showing the corresponding location of the car on a map as the trip video progressed.

In some embodiments, the filtered image data may be returned directly to the client application for additional processing before being displayed on the device's display. In other embodiments, even if the "metadata track" approach is employed, a lower resolution version of the filtered image may be rendered and displayed on the device's preview screen in near-real time.

Figure 10:
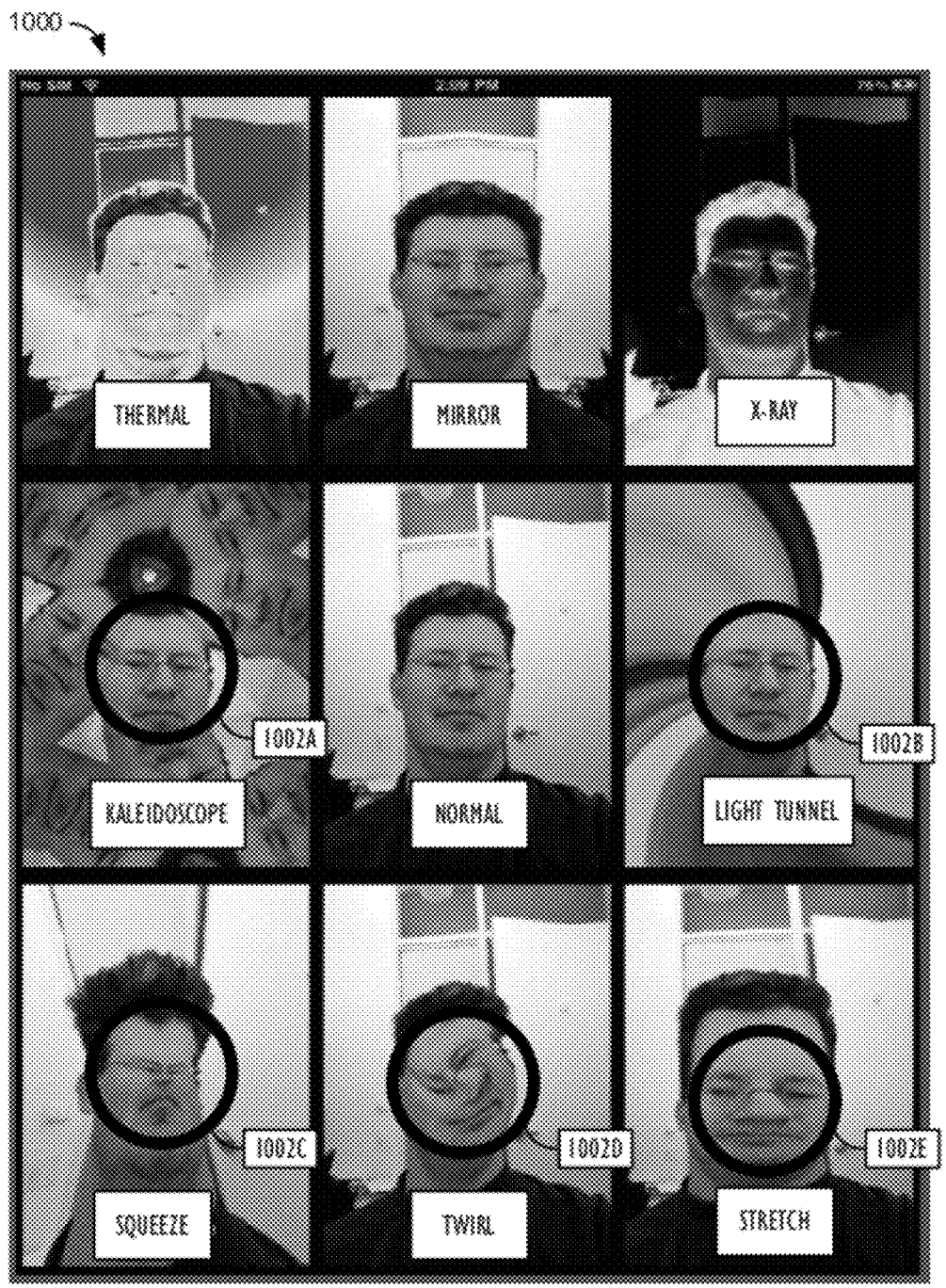
FIG. 10 illustrates nine various image filters on the display of a personal electronic device, in accordance with one embodiment.

Examples of various mage distortion filters are shown in FIG. 10. Exemplary image distortion filters 1000 may comprise: a Thermal Filter (which may make the image appear as though it is being viewed with thermal imaging), a Mirror Filter (which inverts some portion of the image data), an X-Ray Filter (which produces an effect similar to looking at an x-ray image), a Kaleidoscope Filter (which breaks a portion of the image up into pieces and then applies geometric distortions to the image pieces), a Light Tunnel Filter (which may make a portion of the image appear as though it is located at the end of a tunnel of light), a Squeeze Filter (which may pinch in a portion of the image), a Twirl Filter (which may twist a portion of the image around a central rotation point), or a Stretch Filter (which may pull out a portion of the image). Some of the exemplary image distortion filters mentioned above may have what is referred to herein as a "central focus" (labeled 1002*a*-1002*e* in FIG. 10), that is, an area within the image about which the distorting effect of the filter is centered. For example, in the case of a Twirl Filter, the portion of the image that is twirled may be a circular region of the image whose center point serves as a rotation point for the twirl effect. Thus, the circular region 1002*d* would be referred to as the "central focus" point of the image filter. As the composition of the image changes, so too can the location of the central focus of the image filter (as specified by the metadata information). In one embodiment, for example, the central focus may track the location of a face within the image. In another embodiment, there may be more than one central focus, and each central focus may track a separate face in the image data as the face moves within the image.

Figure 11:
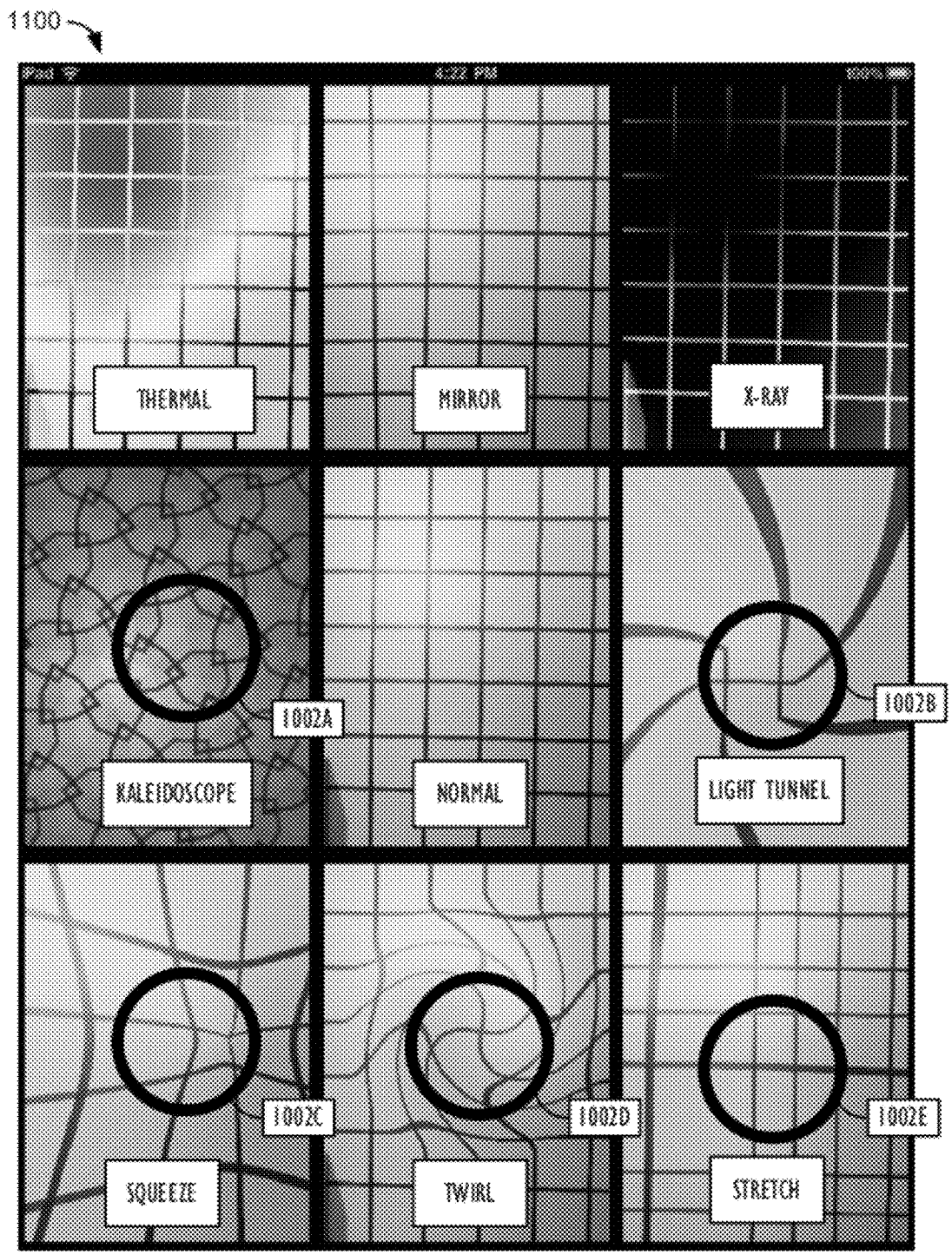
FIG. 11 illustrates grid overlays for the nine image filters of FIG. 10, in accordance with one embodiment.

Referring now to FIG. 11, grid overlays 1100 for the nine image filters of FIG. 10 are shown, in accordance with one embodiment. The upper left rectangle shows the Thermal overlay; the upper central rectangle shows the Mirror overlay; the upper right rectangle shows the X-ray overlay; the middle left rectangle shows the Kaleidoscope overlay; the middle central rectangle shows the image with no overlaid effect, i.e., the Normal overlay; the middle right rectangle shows the Light Tunnel overlay; the lower left rectangle shows the Squeeze overlay; the lower central rectangle shows the Twirl overlay; and the lower right rectangle shows the Stretch overlay. Central foci labeled 1002*a*-1002*e*, corresponding to those labeled in FIG. 10, are also shown in FIG. 11 to highlight the central foci of particular ones of the image filters on their corresponding grid overlays.

Figure 12:
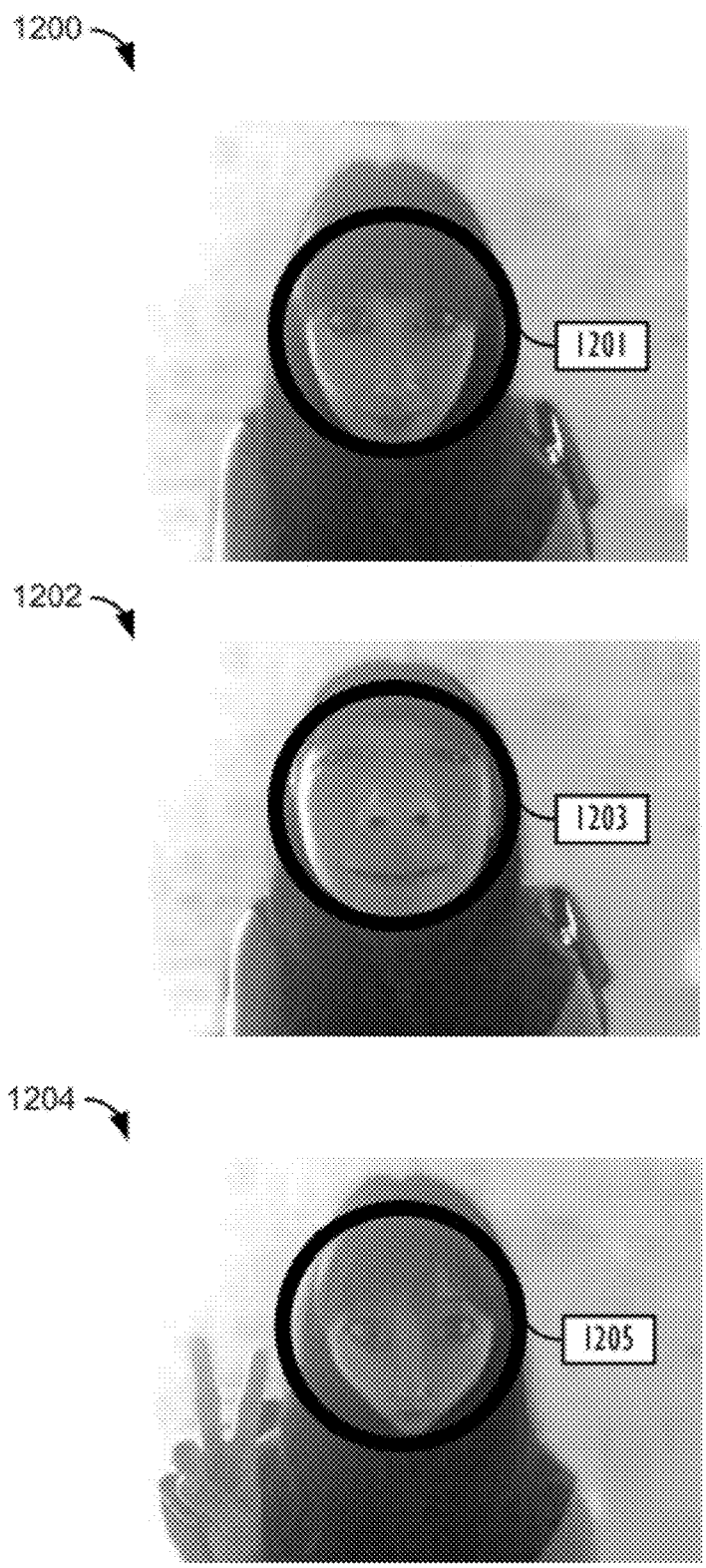
FIG. 12 illustrates various image distortion filters for tracking face size, face center, mouth position and eye position, in accordance with one embodiment.

Referring now to FIG. 12, various image distortion filters 1200/1202/1204 for tracking face size and eye location are shown, in accordance with one embodiment. Filter 1200 has an exemplary central focus labeled as 1201. Filter 1202 has an exemplary central focus labeled as 1203. Filter 1204 has an exemplary central focus labeled as 1206. In each of the exemplary image distortion filters shown in FIG. 12, the extent to which the distortion effect is applied may be determined, at least in part, by image metadata such as the size of the dominant face located in the image data, eye location, mouth location, yaw/pitch/roll (if available), smile confidence and/or blink confidence. That is, based on image metadata, the location of the image filter's central focus, as well as the extent of the image distortion filter may be determined, Likewise, other exemplary image filters may use image metadata comprising the location, size, and/or distance between the eyes located in the dominant face in the image in order to determine the location and/or extent of the image distortion filter.

Figure 13:
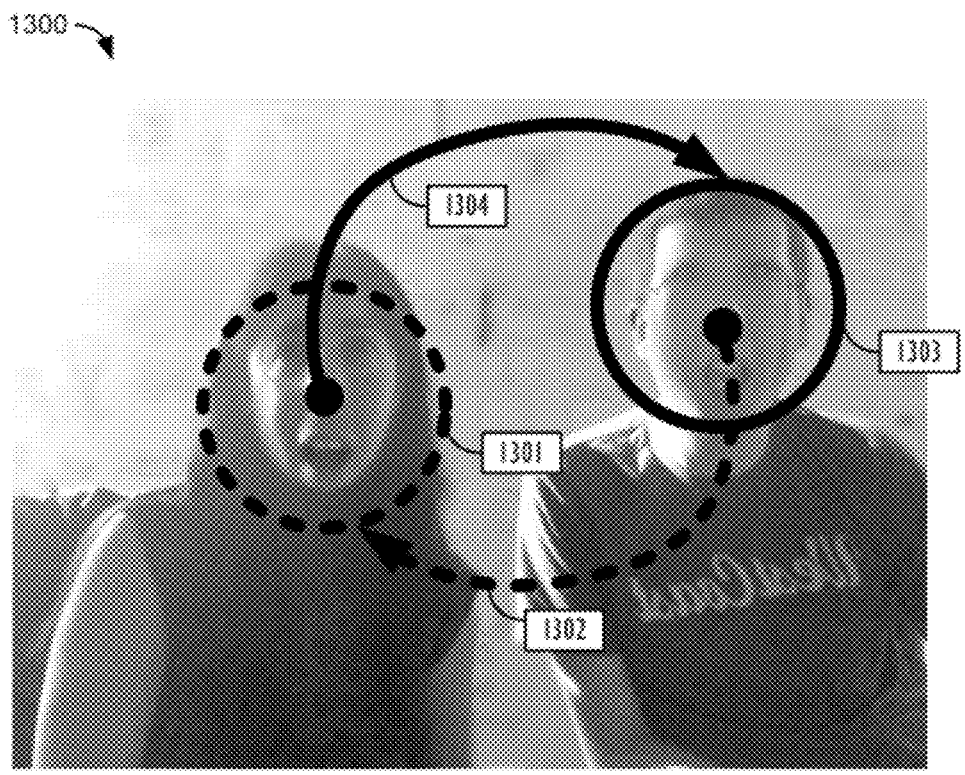
FIG. 13 illustrates an image distortion filter for tracking and distorting multiple faces, in accordance with one embodiment.

Referring now to FIG. 13, an image distortion filter 1300 for tracking and swapping multiple faces 1301/1303 is shown, in accordance with one embodiment. As mentioned above in reference to FIG. 4, the teachings presented herein also allow for image filters with two or more foci. In the particular example shown in FIG. 13, the image data coincident with the location of the face of subject 1303 (the male on the right hand side of the image) has been swapped out with the image data coincident with the location of the face of subject 1301 (the female on the left hand side of the image) and is being updated in real-time as the subjects move around the scene. Dashed line arrow 1302 represents the movement of subject 1303's face information to a new location over the head of subject 1301. Likewise, solid arrow 1304 represents the movement of subject 1301's face information to a new location over the head of subject 1303.

Figure 14:
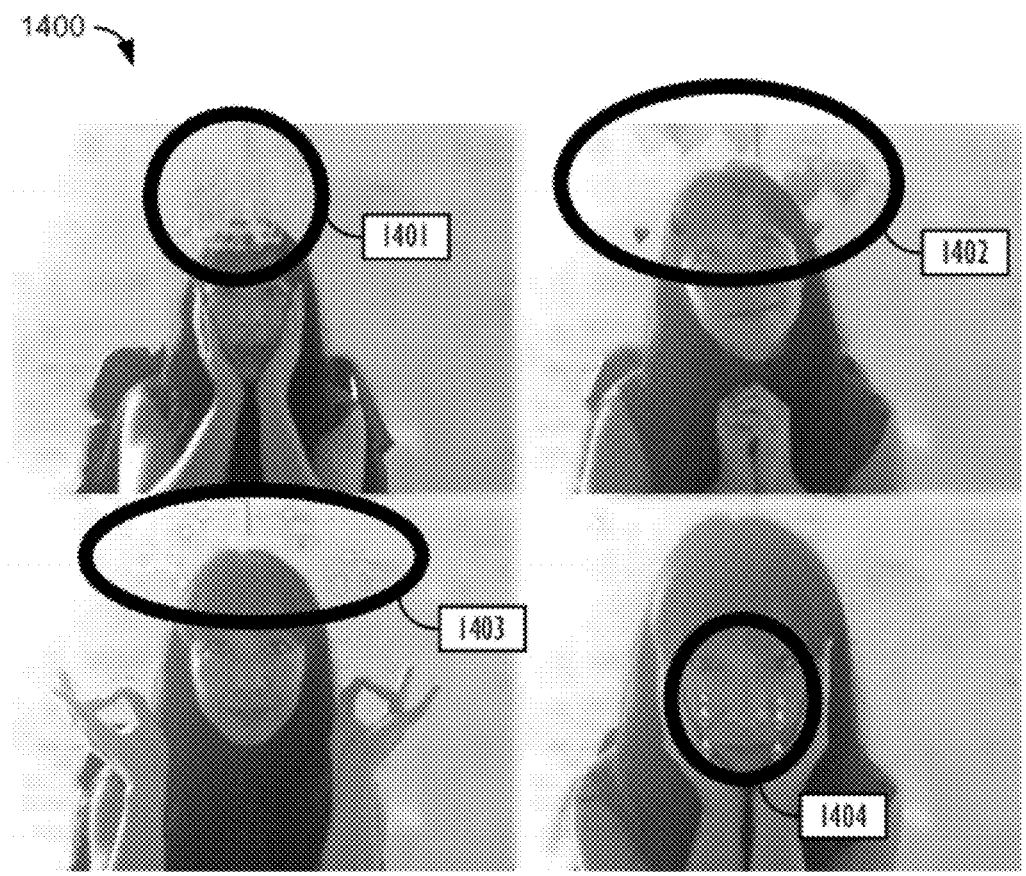
FIG. 14 illustrates various image distortion filters for compositing graphical assets that track faces, in accordance with one embodiment.

Referring now to FIG. 14, various illustrative image filters 1400 for compositing graphical assets 1401/1402/1403/1404 that track faces are shown, in accordance with one embodiment. Graphical asset 1401 comprises a crown, and is representative of a graphical asset type that an image filter according to one embodiment may attempt to keep located above a face as the face moves within an image. Graphical asset 1402 comprises a cluster of floating hearts, and is representative of a graphical asset type that an image filter according to another embodiment may attempt to keep located above a face as the face moves within an image, potentially applying further processing to give the asset the effect of "orbiting" around the subject of interest in the image. Graphical asset 1403 comprises a star field, and is representative of a graphical asset type that an image distortion filter according to one embodiment may attempt to keep "floating" above the face as it moves within an image. Graphical asset 1404 comprises tears, and is representative of a graphical asset type that an image filter according to one embodiment may attempt to keep located below the located eyes of the dominant face in the image as it moves within the image. Many other possible image distortion filters are possible to implement according to the teachings disclosed herein, limited only by the image processing capabilities of the device upon which they are being performed.

Figure 15:
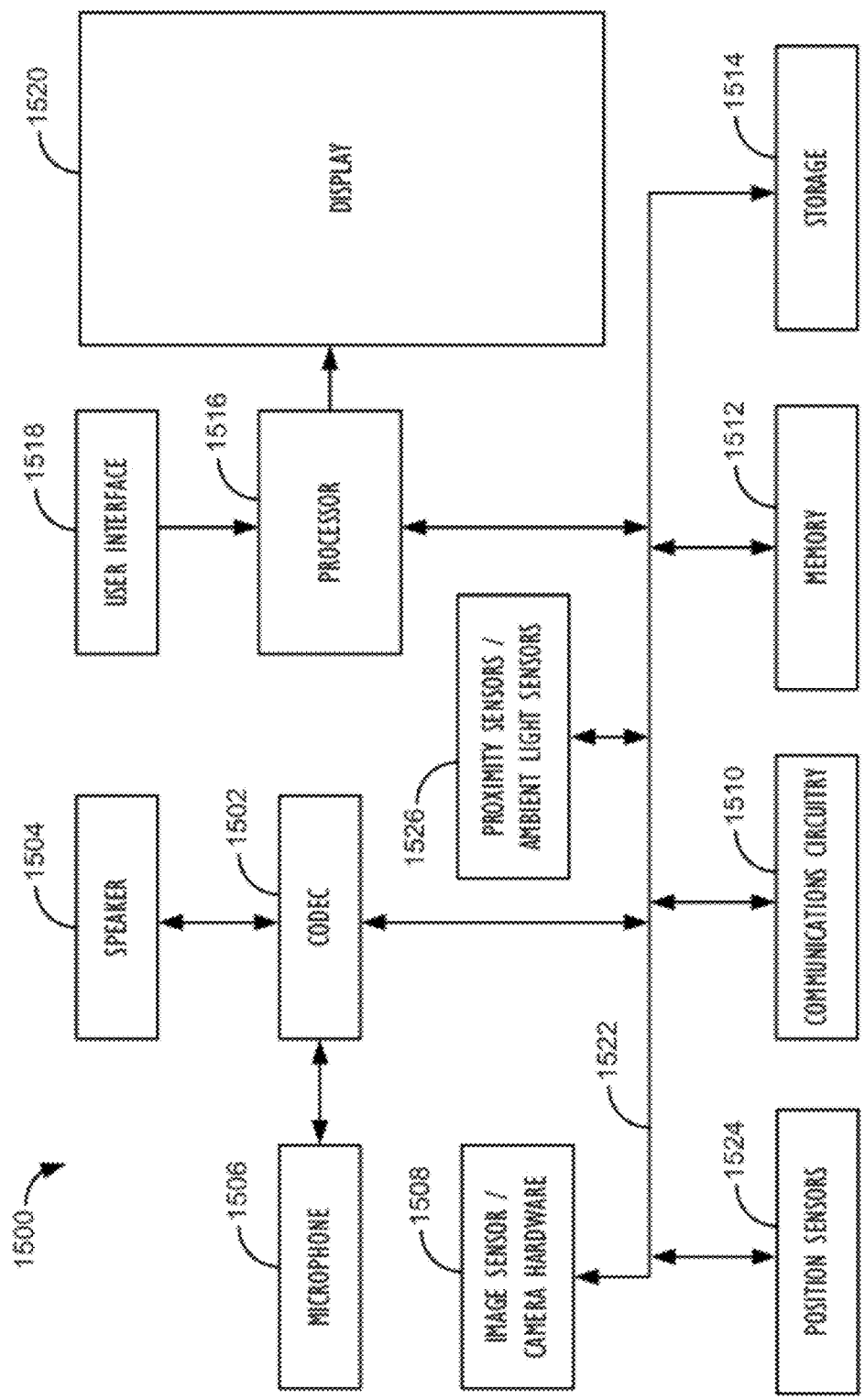
FIG. 15 illustrates a simplified functional block diagram of a device possessing a display, in accordance with one embodiment.

Referring now to FIG. 15, a simplified functional block diagram of a representative electronic device possessing display 1500 according to an illustrative embodiment, eg, camera device 208, is shown. Electronic device 1500 may include processor 1516, display 1520, proximity sensor/ambient light sensor 1526, microphone 1506, audio/video codecs 1502, speaker 1504, communications circuitry 1510, position sensors 1524, image sensor with associated camera hardware 1508, user interface 1518, memory 1512, storage device 1514, and communications bus 1522. Processor 1516 may be any suitable programmable control device and may control the operation of many functions, such as the generation and/or processing of image metadata, as well as other functions performed by electronic device 1500. Processor 1516 may drive display 1520 and may receive user inputs from user interface 1518. An embedded processor, such a Cortex® A8 with the ARM® v7-A architecture, provides a versatile and robust programmable control device that may be utilized for carrying out the disclosed techniques. (CORTEX® and ARM® are registered trademarks of the ARM Limited Company of the United Kingdom.)

Storage device 1514 may store media (e.g., image and video files), software (e.g., for implementing various functions on device 1500), preference information, device profile information, and any other suitable data. Storage device 1514 may include one more non-transitory storage mediums for tangibly recording image data and program instructions, including for example, a hard-drive, permanent memory such as read-only memory (ROM), semi-permanent memory such as random-access memory (RAM), or cache.

Memory 1512 may include one or more different types of memory which may be used for performing device functions. For example, memory 1512 may include cache, ROM, and/or RAM. Communications bus 1522 may provide a data transfer path for transferring data to, from, or between at least storage device 1514, memory 1512, and processor 1516. User interface 1518 may allow a user to interact with electronic device 1500. For example, user input device 1518 can take a variety of forms, such as a button, keypad, dial, a click wheel, or a touch screen.

In one embodiment, personal electronic device 1500 may be a electronic device capable of processing and displaying media such as image and video files. For example, personal electronic device 1500 may be a device such as such a mobile phone, personal data assistant (PDA), portable music player, monitor, television, laptop, desktop, and tablet computer, or other suitable personal device.

The foregoing description of preferred and other embodiments is not intended to limit or restrict the scope or applicability of the inventive concepts conceived of by the Applicants. As one example, although the present disclosure focused in some embodiments on face detection-related metadata, it will be appreciated that the teachings of the present disclosure can be applied to other implementations, such as gesture-related metadata or like. In exchange for disclosing the inventive concepts contained herein, the Applicants desire all patent rights afforded by the appended claims. Therefore, it is intended that the appended claims include all modifications and alterations to the full extent that they come within the scope of the following claims or the equivalents thereof.

What is claimed is:

1. A non-transitory program storage device, readable by a programmable control device comprising instructions stored thereon for causing the programmable control device to perform operations comprising:
    obtaining a first image of a first scene, the first image stored in a first memory and including a timestamp to uniquely identify the first image among a plurality of images obtained from an incoming video stream;
    characterizing the first image;
    generating metadata information for the first image based at least in part on the act of characterizing, the metadata information identifying a plurality of faces in the first image;
    attaching the metadata information to the first image based on the timestamp corresponding to the first image;
    programmatically selecting one of the identified plurality of faces based at least in part on the generated metadata information;
    applying an image filter to the first image to generate a second image, wherein an effect of the filter is centered at the selected face; and
    storing the second image in a second memory.

2. The non-transitory program storage device of claim 1, wherein the operation for selecting comprises selecting a largest face from the plurality of faces based, at least in part, on the metadata information.

3. The non-transitory program storage device of claim 1, wherein the operation for selecting comprises selecting a face from the plurality of faces that is most likely to include open eyes based, at least in part, on the metadata information.

4. The non-transitory program storage device of claim 1, wherein operation for of selecting comprises selecting a face from the plurality of faces that has a longest persistence in the scene based, at least in part, on the metadata information.

5. The non-transitory program storage device of claim 1, wherein the operation for selecting comprises selecting a face from the plurality of faces that is closest to a center of the first image based, at least in part on the metadata information.

6. The non-transitory program storage device of claim 1, wherein the operations further comprise storing the metadata information in the second memory.

7. The non-transitory program storage device of claim 1, wherein the operations further comprise storing the metadata information in a metadata track separate from the first image or the second image.

8. The non-transitory program storage device of claim 1, wherein the image filter comprises a distortion filter.

9. An electronic device, comprising:
    memory;
    an image sensor;

a display communicatively coupled to the memory; and
a programmable control device communicatively coupled to the memory, display, and image sensor, wherein the memory includes instructions for causing the programmable control device to perform operations comprising:
   obtaining a first image of a first scene, the first image stored in a first memory and including a timestamp to uniquely identify the first image among a plurality of images obtained from an incoming video stream;
   characterizing the first image;
   generating metadata information for the first image based at least in part on the act of characterizing, the metadata information identifying a plurality of faces in the first image;
   coupling the metadata information to the first image based on the timestamp corresponding to the first image;
   programmatically selecting one of the identified plurality of faces based at least in part on the generated metadata information;
   applying an image filter to the first image to generate a second image, wherein an effect of the filter is centered at the selected face; and
   storing the second image in a second memory.

10. A non-transitory program storage device, readable by a programmable control device comprising instructions stored thereon for causing the programmable control device to perform operations comprising:
   obtaining a first image of a first scene, the first image stored in a first memory and including a timestamp to uniquely identify the first image among a plurality of images obtained from an incoming video stream;
   characterizing the first image;
   generating metadata information for the first image based at least in part on the act of characterizing, the metadata information identifying a plurality of faces in the first image;
   time-tagging the metadata with the timestamp corresponding to the first image;
   relating, via the time-tagging, the metadata information to the first image based on the timestamp corresponding to the first image;
   programmatically selecting one of the identified plurality of faces based at least in part on the generated metadata information;
   applying an image filter to the first image to generate a second image, wherein an effect of the filter is centered at the selected face; and
   storing the second image in a second memory.

11. The non-transitory program storage device of claim 10, wherein the image filter comprises one or more of the following image filters: Kaleidoscope, Light Tunnel, Squeeze, Twirl, and Stretch.

12. The non-transitory program storage device of claim 10, wherein the operations further comprise storing the metadata information in the second memory.

13. The non-transitory program storage device of claim 10, wherein the operations further comprise storing the metadata information in a metadata track separate from the first image or the second image.

14. The non-transitory program storage device of claim 10, wherein the image filter comprises a distortion filter.

15. An image processing method comprising:
   receiving image data from an incoming video stream;
   generating a timestamp to uniquely identify the image data within the incoming video stream;
   receiving metadata describing aspects of an image represented by the image data;
   attaching the metadata to the image data based on the timestamp corresponding to the image data;
   identifying a face in the image based on the metadata;
   determining one or more input parameters to an image filter based on the meta data;
   applying the image filter centered at the identified face using the one or more input parameters to generate a filtered image; and
   storing the filtered image in a memory.

16. The method of claim 15, further comprising: repeating the operations recited in claim 15 in real-time on the incoming video stream, the incoming video stream including a plurality of images.

17. The method of claim 15, wherein the image filter comprises a distortion filter.

18. The method of claim 15, further comprising the act of storing the metadata in the memory separate from the image data.

19. An image processing system comprising:
   a first server process for receiving and processing an image from an incoming video stream;
   a second server process for generating a timestamp to uniquely identify the image;
   a third server process for generating metadata related to the image and storing the metadata in a metadata track using the timestamp to correlate the metadata with the image; and
   a first memory for storing the processed image,
   wherein the metadata comprises information representative of the image, format description information for the image, and a dictionary of attachments,
   wherein the first server process is further configured to associate the metadata and the image with a buffer frame and send the buffer frame and the metadata track to a client application, and
   wherein the metadata is associated with the buffer frame via the timestamp associated with the image and the buffer frame.

20. The system of claim 19, wherein the client application comprises an image distortion filter.

21. The system of claim 20, wherein the image distortion filter has a central focus.

22. The system of claim 21, wherein a location of the central focus of the image distortion filter is determined at least in part by the metadata related to the image being filtered.

23. The system of claim 22, wherein the dictionary of attachments comprises face location information.

24. The system of claim 23, wherein the location of the central focus of the image distortion filter is further determined by a location of a face specified in the face location information.

25. The system of claim 19, wherein the server process and the client application each are in communication with the first memory.

26. The non-transitory program storage device of claim 1, wherein the operation generating the metadata includes an operation for time-tagging the metadata with the timestamp corresponding to the first image.

* * * * *

UNITED STATES PATENT AND TRADEMARK OFFICE
CERTIFICATE OF CORRECTION

Page 1 of 1

PATENT NO.        : 8,854,491 B2
APPLICATION NO.   : 13/181628
DATED             : October 7, 2014
INVENTOR(S)       : Ford et al.

It is certified that error appears in the above-identified patent and that said Letters Patent is hereby corrected as shown below:

In the claims,

In column 14, line 49, in Claim 4, after "for", delete "of", therefor

Signed and Sealed this
Third Day of November, 2015

Michelle K. Lee
*Director of the United States Patent and Trademark Office*